United States Patent
Leu et al.

(10) Patent No.: US 8,199,540 B2
(45) Date of Patent: Jun. 12, 2012

(54) HIGH VOLTAGE GAIN POWER CONVERTER

(75) Inventors: Ching-Shan Leu, Taipei (TW);
Jing-Cheng Lin, Taipei (TW);
Shun-Yuan Wu, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 354 days.

(21) Appl. No.: 12/683,412

(22) Filed: Jan. 6, 2010

(65) Prior Publication Data

US 2011/0163599 A1    Jul. 7, 2011

(51) Int. Cl.
*H02J 1/10* (2006.01)
*H02J 3/14* (2006.01)
*H02M 7/08* (2006.01)
*H02M 7/10* (2006.01)

(52) U.S. Cl. ........ 363/65; 363/68; 363/69; 307/31

(58) Field of Classification Search ........ 323/222, 323/271, 282; 363/21.04, 21.12, 65, 67, 363/68, 69, 70, 71
See application file for complete search history.

(56) References Cited

U.S. PATENT DOCUMENTS

| | | | |
|---|---|---|---|
| 5,541,828 A * | 7/1996 | Rozman | 363/21.1 |
| 5,550,458 A | 8/1996 | Farrington et al. | |
| 5,929,614 A | 7/1999 | Copple | |
| 6,987,679 B2 * | 1/2006 | Gan et al. | 363/89 |
| 2006/0176031 A1 * | 8/2006 | Forman et al. | 323/267 |

OTHER PUBLICATIONS

"Novel high-efficiency step-up converter", Tseng, K.C. et al., IEEE Proceedings Electric Power Applications, vol. 151, No. 2, Mar. 2004, pp. 182-190.

"High step-up converter with coupled-inductor", Rong-Jong Wai et al., IEEE transactions on power electronics, 2005, vol. 20, No. 5, pp. 1025-1035.

"Analysis of integrated boost-flyback step-up converter", Liang, T.J. et al., IEEE Proceedings Electric Power Applications, vol. 152, No. 2, Mar. 4, 2005, pp. 217-225.

"High-efficiency, high step-up DC-DC converters", Qun Zhao et al., IEEE Transactions on Power Electronics, vol. 18, No. 1, Jan. 2003, pp. 65-73.

"A front-end DC/DC converter for network server applications", Qun Zhao et al., Power Electronics Specialists Conference, 2001. PESC. 2001 IEEE 32nd Annual, vol. 3, pp. 1535-1539.

"High-Efficiency DC-DC Converter with High Voltage Gain and Reduced Switch Stress", Rong-Jong Wai et al., IEEE Transactions on Industrial Electronics, vol. 54, No. 1, Feb. 2007, pp. 354-364.

(Continued)

*Primary Examiner* — Adolf Berhane
*Assistant Examiner* — Emily Pham
(74) *Attorney, Agent, or Firm* — Rabin & Berdo, P.C.

(57) ABSTRACT

A high voltage gain power converter includes: a main switch element; an assistant switch element; a first inductive element, a first switch element, and a first capacitive element; and a second inductive element, a second switch element, and a second capacitive element. The first inductive element is connected between an input node and first switch element. The first capacitive element, connected between the first switch element and ground, provides a first boost output voltage. The second inductive element is connected between the main switch element and first capacitive element. The second switch element is connected to a common node of the second inductive element and main switch element. The second capacitive element, connecting the second switch element to a first node, provides a second boost output voltage. The assistant switch element is connected between the first inductive element and common node of the second inductive element and main switch element.

16 Claims, 10 Drawing Sheets

OTHER PUBLICATIONS

"A design approach for server power supplies for networking applications", Huber, L. et al., Applied Power Electronics Conference and Exposition, 2000. APEC 2000. Fifteenth Annual IEEE, vol. 2, pp. 1163-1169.

"The Tapped-Inductor Boost Converter", Vazquez, N. et al., Industrial Electronics, 2007. ISIE 2007. IEEE International Symposium on, Jun. 4-7, 2007, pp. 538-543.

"High Conversion Ratio DC-DC Converters With Reduced Switch Stress", Ismail, E.H. et al., IEEE Transactions on Circuits and Systems I, vol. 55, No. 7, Aug. 2008, pp. 2139-2151.

Li, W., Lv, X., Deng, Y., Liu, J., He, X., "A review of non-isolated high step-up DC/DC converters in renewable energy applications", (2009) Conference Proceedings—IEEE Applied Power Electronics Conference and Exposition—APEC, art. No. 4802683, pp. 364-369.

* cited by examiner

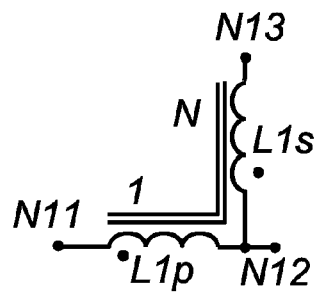
FIG. 2B  FIG. 2C
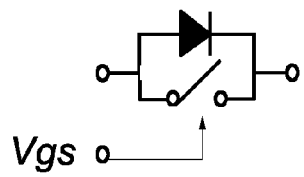
FIG. 3A  FIG. 3B
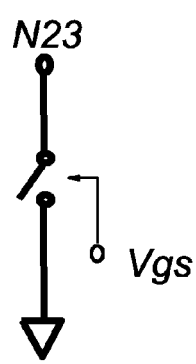
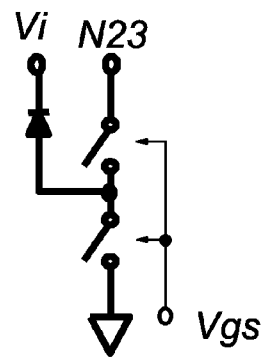
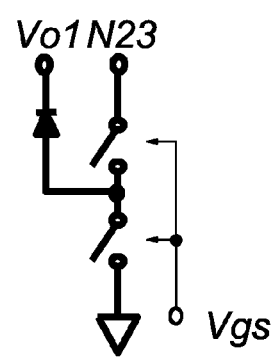
FIG. 4A  FIG. 4B  FIG. 4C

HIGH VOLTAGE GAIN POWER CONVERTER

BACKGROUND OF THE INVENTION

1. Field of the Invention

The invention relates in general to a power converter, and more particularly to a high voltage gain power converter for converting an input voltage to an output voltage with a higher voltage level.

2. Description of the Related Art

The boost power converters have been widely used in many applications, such as the frond-end stage for a battery source, the DC back-up energy system for an uninterruptible power supply (UPS), and solar energy sources. The boost converter is sometimes called a step-up converter since it steps up the source voltage.

Conventionally, the boost converter includes an inductor, a power switch, a diode, and a capacitor. The boost converter is able to achieve high voltage gain when it operates in heavy duty cycle for the power switch. However, its voltage gain is limited to about five due to the losses of the circuit parasitic components in practice.

To increase the voltage gain, a cascade or a coupled-inductor schemes can be used instead. The former scheme was proposed in several IEEE papers and the latter scheme is disclosed in U.S. Pat. Nos. 8,392,124 and 8,386,1096, issued to Wai et al. However, the high voltage gain can be obtained at the cost of raising the circuit complexity.

Thus, there is a need for exploring a higher voltage gain with a simple power converter configuration and operating with a smaller duty cycle.

SUMMARY OF THE INVENTION

The invention is directed to a high voltage gain power converter for converting an input voltage to an output voltage with a higher voltage level. According to some embodiments of the power converter, a simple power converter configuration operating with a smaller duty cycle can be achieved with a high voltage gain.

According to an aspect of the invention, a power converter including a main switch element, a first output circuit unit, a second output circuit unit, and an assistant switch element is provided. The first output circuit unit, operated with respect to the main switch element, is used for providing a first boost output voltage. The first output circuit unit includes a first inductive element, a first switch element, and a first capacitive element. The first inductive element is connected between the input node and the first switch element. The first capacitive element, connected between the first switch element and a ground, is used for providing the first boost output voltage. The second output circuit unit, operated with respect to the main switch element, is used for providing a second boost output voltage. The second output circuit unit includes a second inductive element, a second switch element, and a second capacitive element. The second inductive element is connected between the main switch element and the first capacitive element. The second switch element is connected to a common node of the second inductive element and the main switch element. The second capacitive element, connecting the second switch element to a first node, is used for providing the second boost output voltage. The assistant switch element is connected between the first inductive element and the common node of the second inductive element and the main switch element.

According to other aspects of the invention, the first output circuit unit and the second output circuit unit, as included in the power converter above, can be implemented to additionally provide at least one boost output voltage.

The invention will become apparent from the following detailed description of the preferred but non-limiting embodiments. The following description is made with reference to the accompanying drawings.

BRIEF DESCRIPTION OF THE DRAWINGS

FIG. 2B is a schematic diagram showing an example of a first inductor L1 as the first inductive element 70 of the power converter 100 in FIG. 1.

FIG. 2C is a schematic diagram showing an example of a second inductor L2 as the second inductive element 80 of the power converter 100 in FIG. 1.

FIGS. 3A and 3B are schematic diagrams showing two alternative constructions of the switch elements 10, 20 and 50 of the power converter 100 in FIG. 1.

FIGS. 4A, 4B and 4C are schematic diagrams showing the three possible constructions of the main switch element 60 of the power converter 100 in FIG. 1.

DETAILED DESCRIPTION OF THE INVENTION

Figure 1:
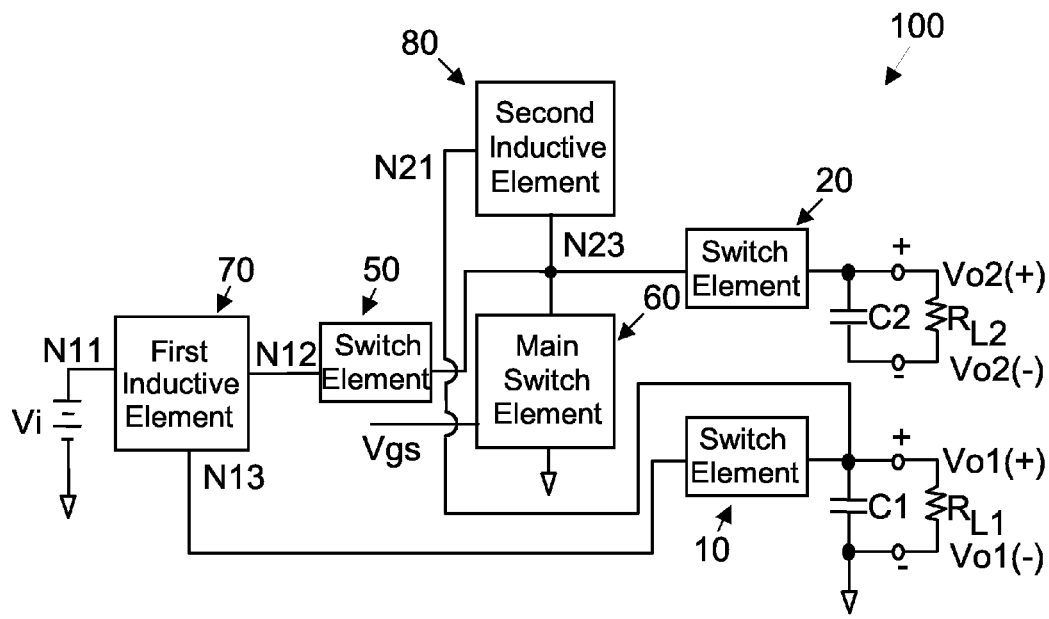
FIG. 1 is a block diagram showing a power converter 100 according to a first embodiment of the invention.

FIG. 1 shows a power converter 100 according to a first embodiment. As shown in FIG. 1, the power converter 100 includes three switch elements 10, 20 and 50, a main switch element 60, a first inductive element 70, a second inductive element 80, and two capacitors C1 and C2. The power converter 100, for example, provides two output voltages Vo1(+)–Vo1(−), Vo2(+)–Vo2(−) when two corresponding resistors $R_{L1}$ and $R_{L2}$ are employed as the load. In addition, in FIG.

1, the first inductive element 70, the switch element 10, and the capacitor C1 (or a capacitive device) can be regarded as a first output circuit unit, receiving an input voltage V1, for providing a first boost output voltage, i.e., Vo1(+)–Vo1(−). The second inductive element 80, the switch element 20, and the capacitor C2 (or a capacitive device) can be regarded as a second output circuit unit for providing a second boost output voltage, i.e., Vo2(+)–Vo(−). Operating at a smaller operating duty cycle, the power converter 100 can obtain a high voltage gain with minimum component count.

Figure 2A:
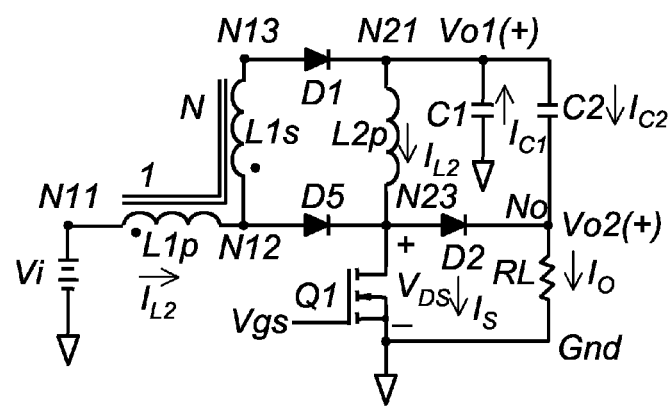
FIG. 2A is a circuit diagram showing an example of the power converter according to the first embodiment of this invention.

Referring to FIG. 1, FIG. 2A is an example of the power converter 100 according to the first embodiment of this invention. As shown in FIG. 2A, the first inductive element 70, the second inductive element 80, and the three switch elements 10, 20, 50, for example, are implemented by those in FIG. 2B, FIG. 2C, and FIG. 3A, respectively. The first inductive element 70 is realized by a first inductor L1 with 1:N turns ratio of the tapped windings L1p-L1s, as shown in FIG. 2B, wherein N11, N12, and N13 denote nodes of the first inductor L1, and the second inductive element 80 is realized by a second inductor L2 with a single winding L2p, as shown in FIG. 2C, wherein N21 and N23 indicate nodes of the second inductor L2. Applying a MOSFET Q1 as an example, the main switch element 60 is implemented by that in FIG. 4A. The output voltages across the output capacitors C1 and C2, Vo1(+)–Vo1(−) and Vo2(+)–Vo2(−), are connected in series at a node (i.e., N21).

Figure 5A:
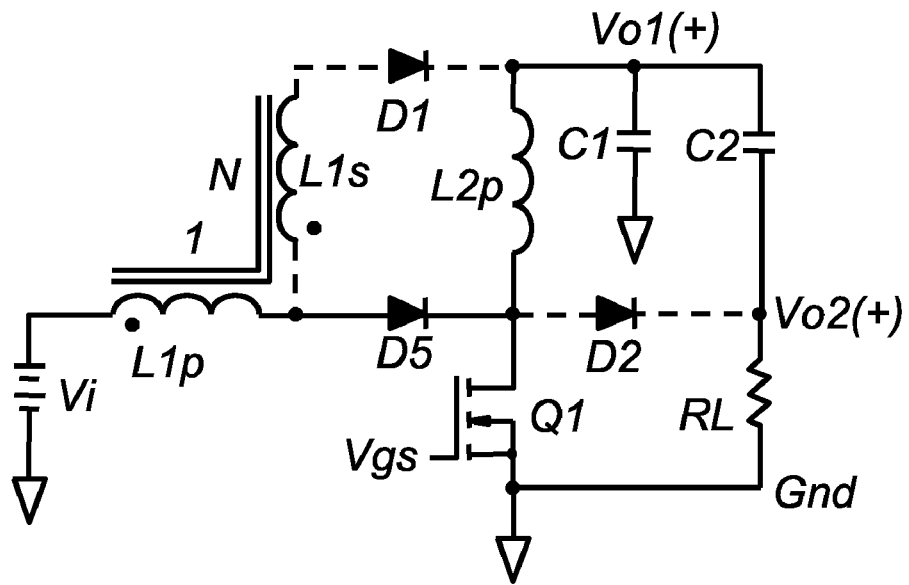
FIGS. 5A and 5B show two equivalent circuits of the power converter 100 in FIG. 2A when the main switch element 60 is turned on and turned off, alternately.
Figure 5B:
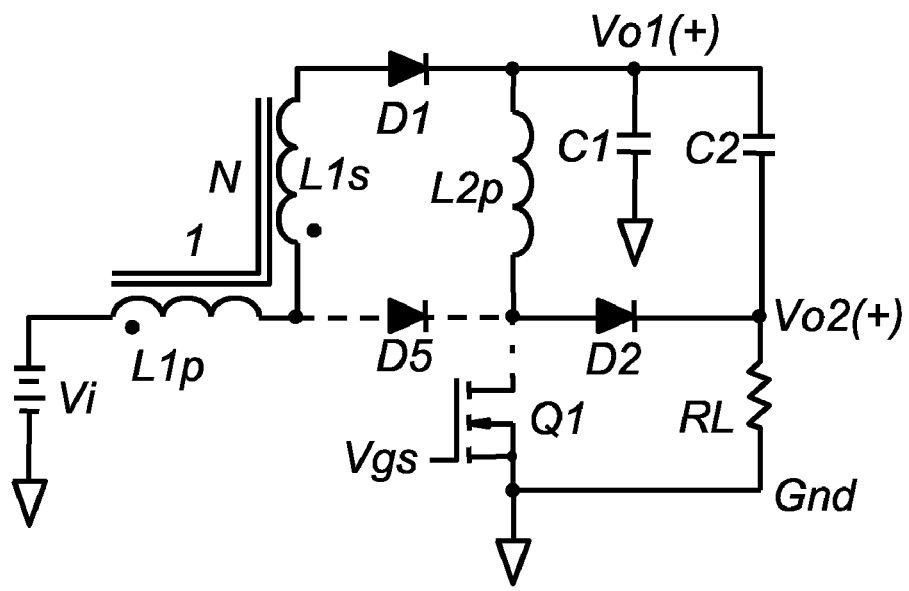

Referring to FIG. 2A, FIGS. 5A and 5B are two circuit diagrams to represent the equivalent stages during the turning on and turned off of the main switch Q1, respectively. Referring to the key waveforms in FIG. 5C, the main switch Q1 is controlled by a signal Vgs (or regarded as a driving signal) provided by a control circuit (not shown). As a result, each switching cycle of the signal Vgs has two time intervals T0 and T1 according to the turning on and off of the main switch Q1.

Figure 5C:
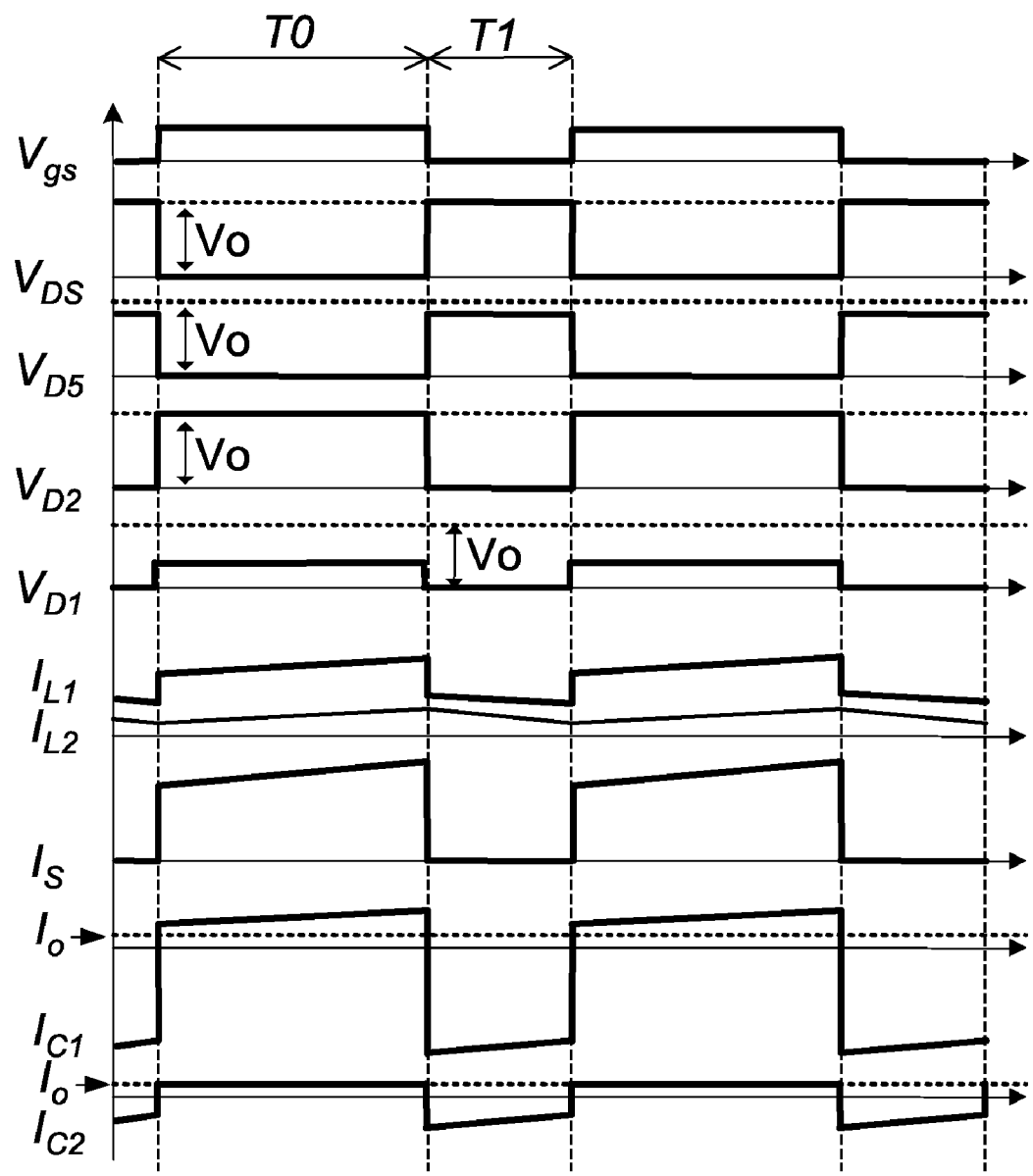
FIG. 5C shows a number of waveforms obtained from the power converter 100 in FIG. 2A.

During the time interval T0, the signal Vgs is enabled to turn on the main switch Q1 and the diode D5 (i.e. forward-biased) and turn off the diodes D1 and D2 (i.e. reversed-biased). The voltages $V_{DS}$ and $V_{D5}$ respectively across the main switch Q1 and the diode D5, which are turned on, are at low voltage levels, and the voltages $V_{D1}$ and $V_{D2}$ respectively across the diodes D1 and D2, which are turned off, are at high voltage levels. The inductor winding L1p is charged by the input voltage V1 through the diode D5 and the main switch Q1 while the inductor winding L2p is charged by the boost output voltage Vo1 through the main switch Q1. Accordingly, during time interval T0, the currents $I_{L1}$ and $I_{L2}$ respectively flowing through the inductor winding L1p and the inductor winding L2p, as well as the current $I_S$ of the main switch Q1, is increasing while the current $I_{C1}$ flowing into the capacitor C1 is decreasing in positive sign, as shown in FIG. 5C. In addition, the diode D5 is turned on or off as same as the main switch Q1 does and can be regarded as assisting the main switch Q1 for proper circuit operation, or called an assistant switch element or device. The main switch Q1 along with the assistant switch device substantially switches the operation of the first and second output circuit units of the power converter 100.

During the time interval T1, the signal Vgs is disabled to turn off the main switch Q1, and the operation of the power converter 100 enters the second stage. The diode D5 is turned off and the voltages $V_{DS}$ and $V_{D5}$ respectively across the main switch Q1 and the diode D5, which are turned off, are at high voltage levels, and the voltages $V_{D1}$ and $V_{D1}$ respectively across the diodes D1 and D2, which are turned on, are at low voltage levels. The capacitor C1 is charged and clamped to sum of the input voltage and the voltages across the tapped winding L1p-L1s while the capacitor C2 is charged by the sum of the first output voltage Vo1(+)–Vo1(−) and the voltage across the inductor winding L2p. Accordingly, during time interval T1, the currents $I_{C1}$ and $I_{C2}$ respectively flowing though the capacitors C1 and C2 are increasing in negative signs, as shown in FIG. 5C.

Therefore, in the power converter 100, the output current Io which provides power to the resistor $R_L$ can be provided by the capacitors C1 and C2 during the time interval T0, and can be provided by the first output voltage Vo1(+)–Vo1(−) and the inductor L2p during the time interval T1. The output voltage Vo2(+)–Gnd is substantially equivalent to the sum of the two voltages across the capacitors C1 and C2.

According to the voltage-second balance of the inductor L1p and L2p, we can obtain equations as follows:

$$Vi \cdot D + \frac{Vo1 - Vi}{(1+N)}(1-D) = 0 \quad (1)$$

$$Vo1 \cdot D + (Vo2 - Vo1)(1-D) = 0 \quad (2)$$

wherein the D denotes the duty cycle of the signal Vgs for controlling the main switch Q1, where the duty cycle is defined as D=T0/(T0+T1).

The voltage gains, Vo1/Vi and Vo2/Vo1, can be derived as:

$$\frac{Vo1}{Vi} = \frac{1 + ND}{1 - D} \quad (3)$$

$$\frac{Vo2}{Vo1} = \frac{1}{1 - D} \quad (4)$$

Therefore, the overall voltage gain of the power converter 100, which is denoted as (Vo2/Vi), is derived as Eq. (5):

$$\frac{Vo2}{Vi} = \frac{1 + ND}{(1 - D)^2} \quad (5)$$

Figure 5D:
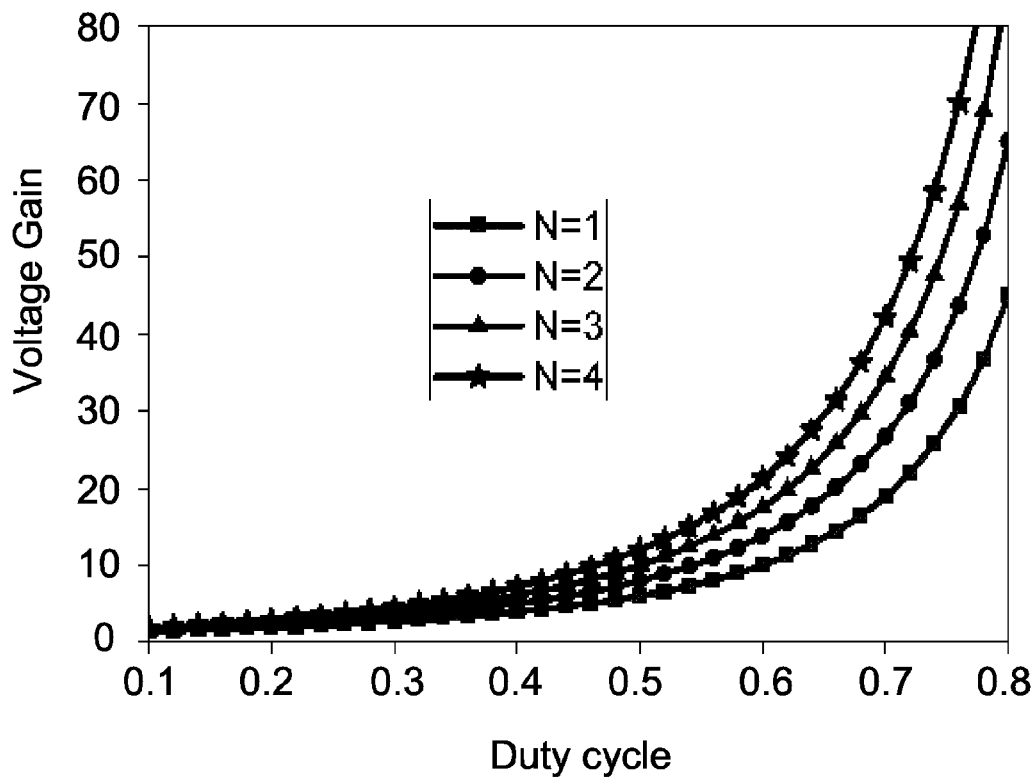
FIG. 5D shows the relationship between the voltage gain and the duty cycle of the power converter 100 in FIG. 2A with respect to the turns-ratio of the first inductor L1.

According to the Eq. (5), FIG. 5D shows the relationship between the voltage gain and the duty cycle of the power converter 100 in FIG. 2A with respect to the turns-ratio N of the tapped winding. As can be observed, the power converter 100 with higher turns-ratio N will have higher voltage gain with respect to a specific duty cycle D. For example, the turns-ratio N and the duty cycle D can be designed as N=4 and D=0.6, and the power converter 100 will have a high voltage gain of about 21 as shown. Therefore, a higher voltage gain can be achieved without operating at heavy duty cycle compared to that of the proposed boost converters.

Figure 5E:
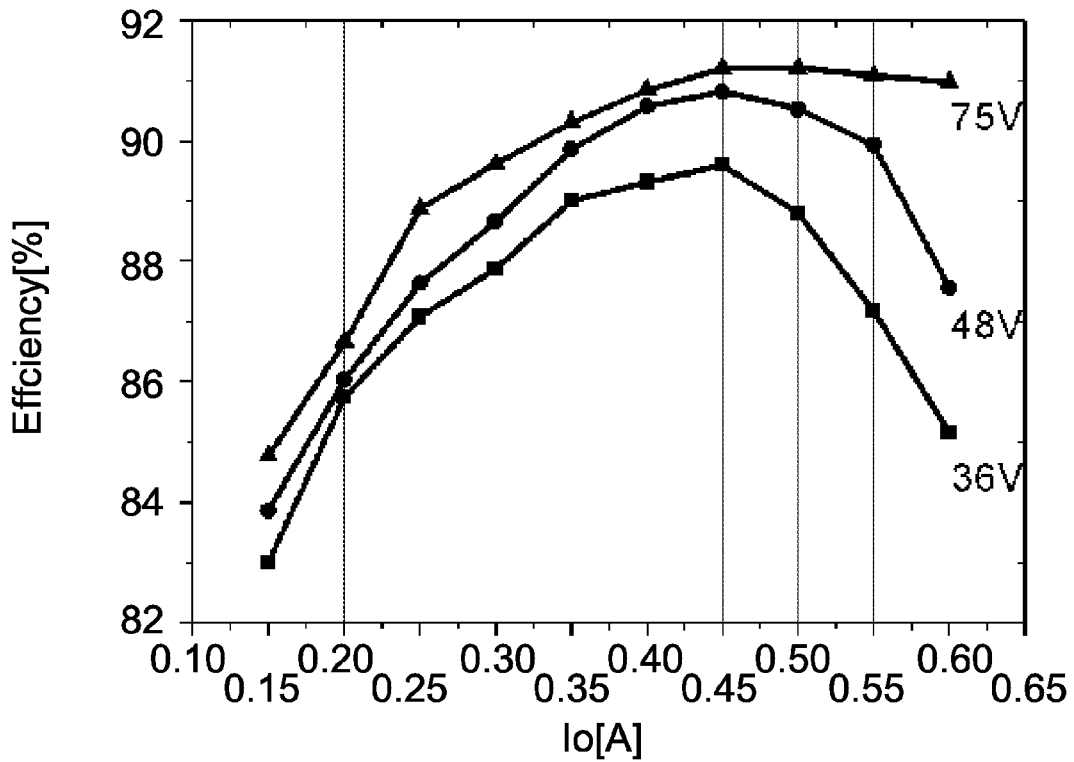
FIG. 5E shows the measured efficiencies of the power converter 100 in FIG. 2A with respect to different input voltages and different output currents.

Moreover, this embodiment also implements a power converter 100 with high efficiency. The measured efficiencies of the power converter 100 in FIG. 2A are collected and shown in FIG. 5E with respect to a 36-75 V input voltage range, 400 V output voltage and up to 240 W output power with a switching frequency of 100 kHz. A maximum 91.2% efficiency can be obtained as shown.

There are several circuit variations according to the first embodiment of the current invention. It can be extended by the connection of the second output voltage node Vo2(−) to the ground or the first output voltage node Vo1(+), and/or the selection of the switch element 10, 20 and 50 from the two alternative constructions shown in FIG. 3A and FIG. 3B, and/or the selection of the main switch element 50 from the three constructions shown in FIG. 4A, FIG. 4B and FIG. 4C. Consequently, 128 possible construction can be realized.

Figure 6A:
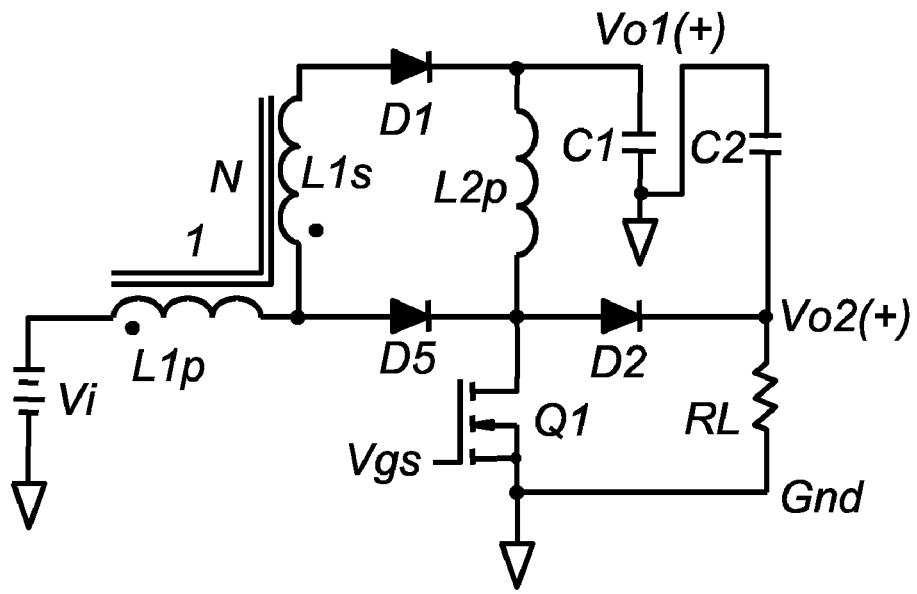
FIGS. 6A-6D are four examples of 128 possible implementations of the power converter according to the first embodiment of the invention.

Among them, FIG. 6A is a circuit diagram showing another example of the power converter 100 according to the first embodiment of this invention. In FIG. 6A, the power converter 100 differs with the power converter 100 in FIG. 2A in that the second terminal Vo2(−) of output voltage is connected to the ground instead of the node N21 in FIG. 2A.

Figure 6B:
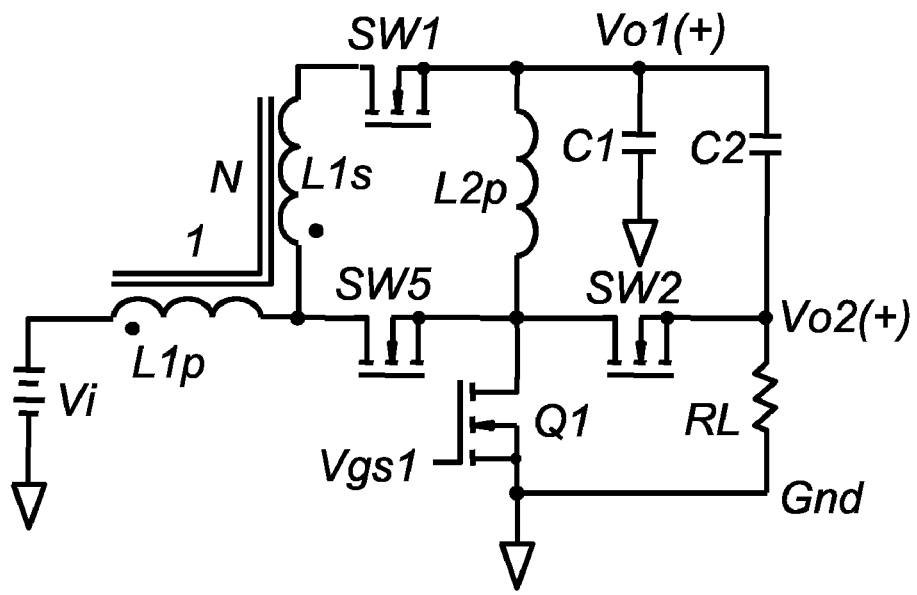

FIG. 6B is a circuit diagram showing another example of the power converter 100 according to the first embodiment of this invention. The power converter 100 in FIG. 6B differs with the power converter 100 in FIG. 2A in that the switch elements 10, 20, and 50, denoted by SW1, SW2, and SW5, respectively, are implemented by MOSFETs. In other examples, the switch element 10 and/or the switch element 20 and/or the switch element 50 can be implemented by a MOSFET. The above switch elements as shown in FIG. 3B can be also implemented by using one diode connected parallel-connected with one bipolar transistor, or one insulated gate bipolar transistor (IGBT), or one electromechanical, or one micro-machined switch, or one other active semiconductor switch. Employing the proper driver signals, such as Vgs1 and Vgs2, as shown in FIG. 6E to the switch element, the power converter 100 has the same performance as that in FIG. 2A. Specifically, the driving signals Vgs1 and Vgs2 are switching signals between corresponding high and low levels. The driving signal Vgs1 is used for driving the Q1 and SW5 while the driving signal Vgs2 is used for driving the SW1 and SW2. In addition, the driving signal Vgs2 is enabled within the sub-period of the driving signal Vgs1 at its low level, with delay times dt and dt', for example as shown in FIG. 6E, for the sake of stability of circuit operation. Because the voltage drop across the turn-on resistance RDSon of the MOSFET is lower than the diode forward voltage drop, the conduction loss can be reduced and a higher efficiency can be obtained.

Figure 6C:
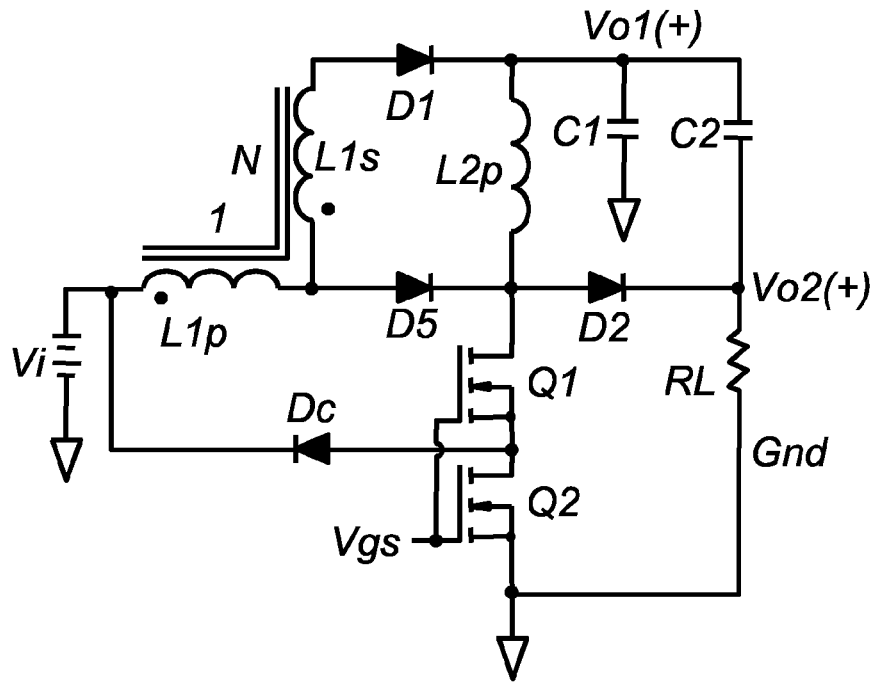
Figure 6D:
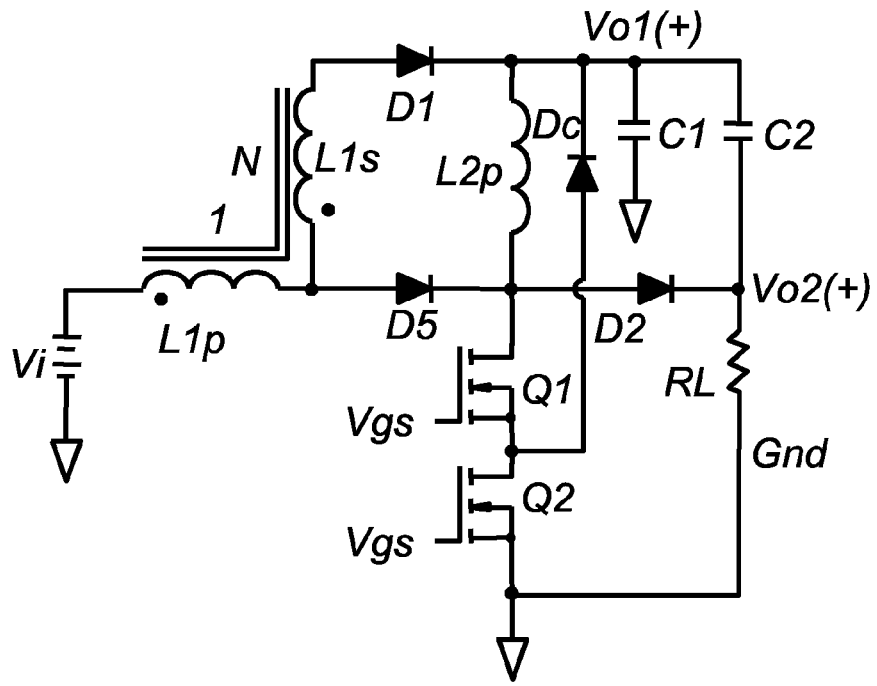
Figure 6E:
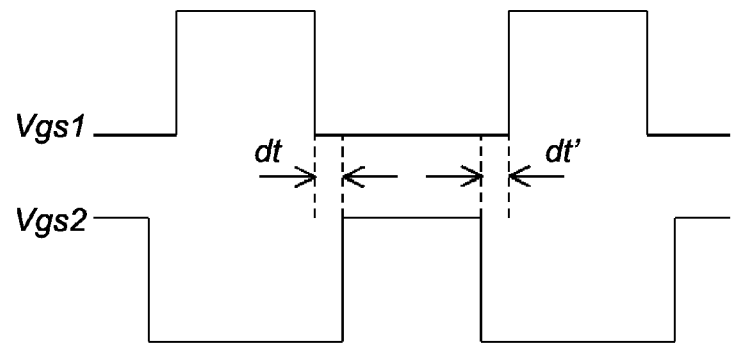
FIG. 6E shows the waveforms of two signals for controlling the main switch element 60 and the switch elements 10, 20, and 50 realized by using the circuit diagram shown in FIG. 3B according to an embodiment of this invention.

FIG. 6C and FIG. 6D are two circuit diagrams showing another two examples of the power converter 100 according to the first embodiment of this invention. Both the power converter 100 in FIG. 6C and the power converter 100 FIG. 6D, differ with the power converter 100 in FIG. 2A in that the main switch element 60 are implemented by two series-connected Q1, Q2, and a diode Dc as shown in FIG. 4B and FIG. 4C, respectively. As shown in FIG. 6C, the diode Dc is connected to the input voltage resulting in clamping the voltage stress on the Q2 to the Vi. On the contrary, the diode Dc is connected to the first capacitor C1 and the voltage stress on the Q2 is clamped to the Vo1 shown in FIG. 6D. By taking the advantage of two low voltage-rating MOSFETs accompanied with a lower turn-on resistance RDSon, a higher efficiency can be obtained compared to that of using a single high voltage-rating MOSFET in FIG. 2A.

As for the power converters shown in FIGS. 6A to 6D, their operation, thus, can be described similarly with reference to the above-related description of the circuit in FIG. 2A and will not be specified for the sake of brevity.

Figure 7A:
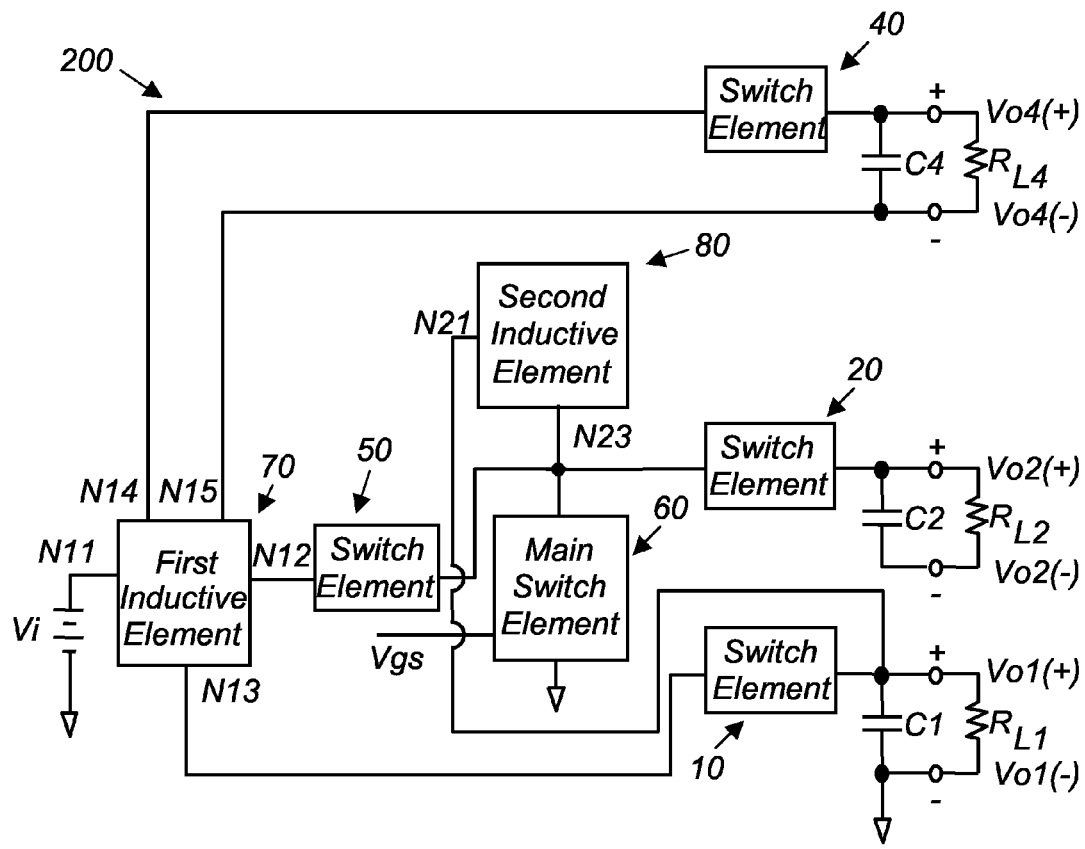
FIG. 7A is a block diagram showing a power converter 200 according to a second embodiment of this invention.
Figure 7B:
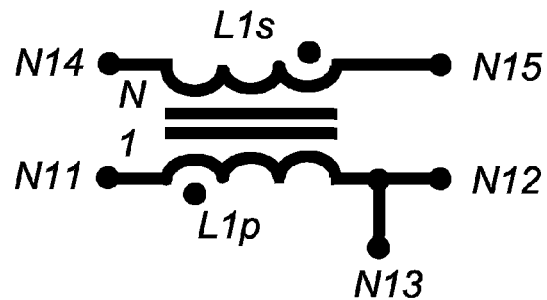
FIG. 7B is a schematic diagram showing an example of a first inductor L1 with windings L1p-L1s as the first inductive element 70 of the power converter 200 in FIG. 7A.

Referring to FIG. 1, FIG. 7A is a block diagram of a power converter 200 according to the second embodiment of this invention showing the first inductive element 70 of the power converter 200 is implemented by that in FIG. 7B. The power converter 200 in FIG. 7A differs from the power converter 100 in FIG. 1 in that nodes N14 and N15 of the first inductor L1 with windings L1s-L1p in FIG. 7B are connected to a switch element 40 and a capacitor C4 in series. The capacitor C4, for example, is connected to a resistor $R_{L4}$ as a load to provide an output voltage Vo4(+)−Vo4(−) in addition to the two output voltages Vo1(+)−Vo1(−) and Vo2(+)−Vo2(−).

Figure 8A:
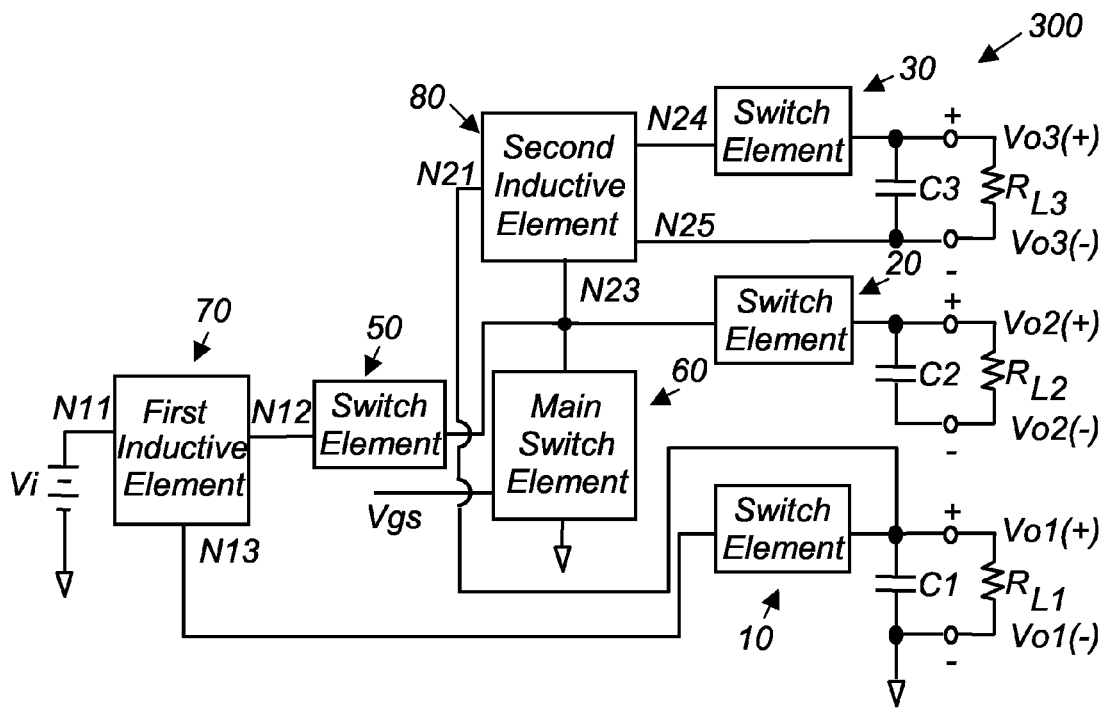
FIG. 8A is a block diagram showing a power converter 300 according to a third embodiment of this invention.
Figure 8B:
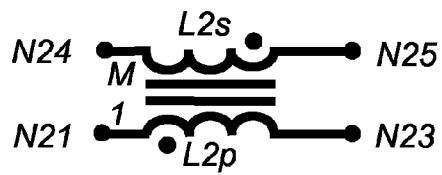
FIG. 8B is a schematic diagram showing an example of a second inductor L2 with windings L2p-L2s as the second inductive element 80 of the power converter 300 in FIG. 8A.

Referring to FIG. 1, FIG. 8A is a block diagram of a power converter 300 according to the third embodiment of this invention showing that the second inductive element 80 of the power converter 300 is implemented by that in FIG. 8B. The power converter 300 in FIG. 8A differs from the power converter 100 in FIG. 1 in that nodes N24 and N25 of the second inductor L2 with windings L2s-L2p as shown in FIG. 8B are connected to a switch element 30 and a capacitor C3 in series. The capacitor C3, for example, is connected to a resistor $R_{L3}$ as a load to provide an output voltage Vo3(+)−Vo3(−) in addition to the two output voltages Vo1(+)−Vo1(−) and Vo2(+)−Vo2(−).

Figure 9:
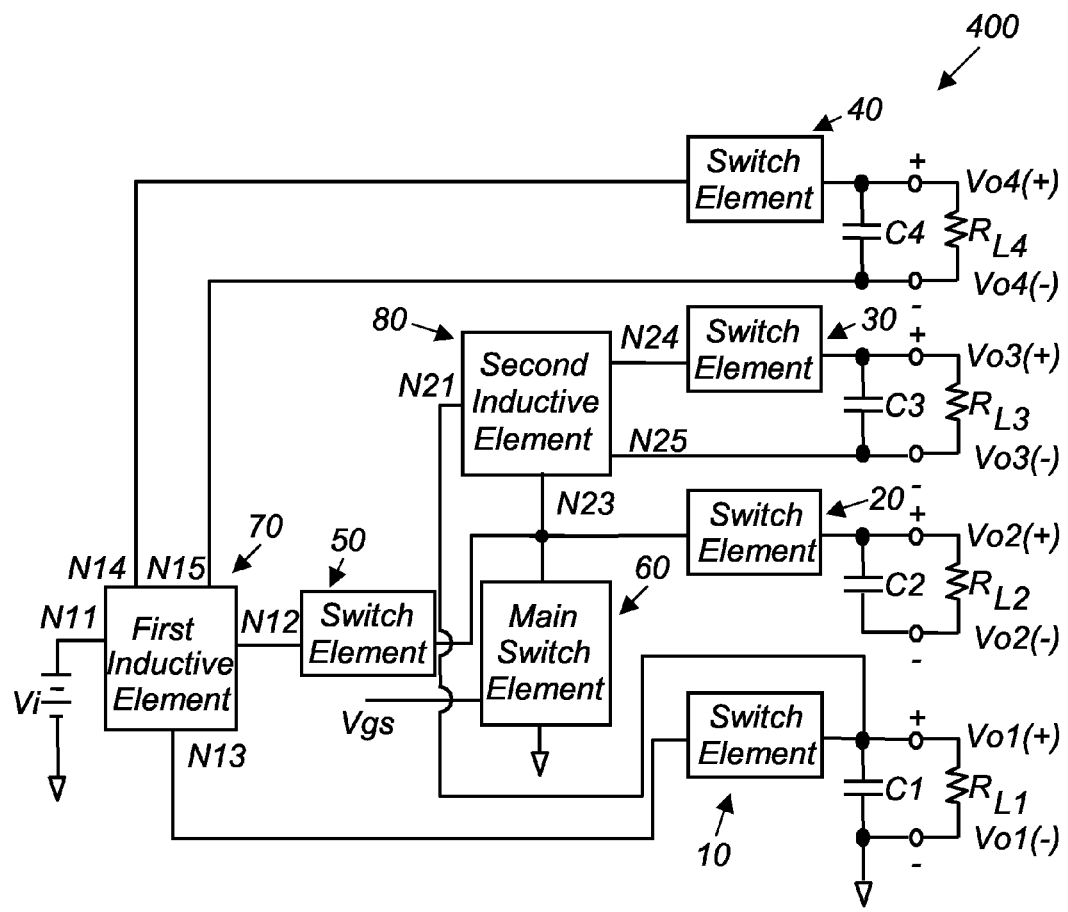
FIG. 9 is a block diagram showing a power converter 400 according to a fourth embodiment of this invention.

Referring to FIG. 1, FIG. 9 is a block diagram of the fourth embodiment of this invention showing the first inductive element 70 and second inductive element 80 of the power converter 400 are implemented by those shown in FIG. 7B and FIG. 8B, respectively. In addition to employing inductive circuits in FIGS. 7B and 8B, the power converter 400 in FIG. 8A, as compared to the power converters 100, 200, and 300, has four output voltages if the capacitors C1 to C4 are, for example, connected to four resistors $R_{L1}$-$R_{L4}$ as the load.

In the above disclosure, four exemplary embodiments for the power converters 100, 200, 300, and 400 are provided in FIGS. 1A, 7A, 8A, and 9, respectively. However, the switch element 10, 20, 30, 40, 50, the main switch element 60, the first inductive element 70, the second inductive element 80 of the above mentioned power converters can also be implemented with reasonable combination of the circuit elements shown in FIGS. 3A-3B, 4A-4C, 2B and 7B, and 2C and 8B, and their equivalents, respectively. As for the power converters 200, 300 and 400 shown in FIGS. 7A, 8A and 9, their operation, thus, can be derived similarly with reference to the above-related description and will not be specified for the sake of brevity.

In addition, the embodiments disclosed above are not for restrictions of the implementations of the invention. The inductive element, as well as the switch element or capacitive element mentioned above, can be implemented by way of a circuit or device having one or more circuit elements to perform the same operation thereof.

While the invention has been described by way of examples and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:
1. A power converter comprising:
 a main switch element;
 a first output circuit unit, operated with respect to the main switch element, for providing a first boost output voltage, comprising:
  a first inductive element, connected to an input node;
  a first switch element, wherein the first inductive element is connected between the input node and the first switch element; and
  a first capacitive element, connected between the first switch element and a ground, for providing the first boost output voltage;
 a second output circuit unit, operated with respect to the main switch element, for providing a second boost output voltage, comprising:

a second inductive element, connected between the main switch element and the first capacitive element;

a second switch element, connected to a common node of the second inductive element and the main switch element; and a second capacitive element, connecting the second switch element to a first node, for providing the second boost output voltage; and an assistant switch element, connected between the first inductive element and the common node of the second inductive element and the main switch element.

2. The power converter according to claim 1, wherein:
the first inductive element comprises a first winding and a second winding connected in series, wherein the first winding is connected between the input node and a common node of the second winding and the assistant switch element, and the second winding is connected between the first winding and the first switch element.

3. The power converter according to claim 1, wherein:
the first inductive element comprises a first winding and a second winding, wherein the first winding is connected between the input node and a common node of the assistant switch element and the first switch element;
wherein the first output circuit unit further comprises:
a fourth switch element; and
a fourth capacitive element connected to the fourth switch element, for providing a fourth boost output voltage, wherein the second winding is connected between the fourth switch element and the fourth capacitive element.

4. The power converter according to claim 3, wherein one of the first, second, fourth, and assistant switch elements comprises a MOSFET or a diode parallel-connected with one of a bipolar transistor, an insulated gate bipolar transistor, an electromechanical switch, a micro-machined switch, and an active semiconductor switch.

5. The power converter according to claim 1, wherein the second inductive element comprises a single winding connected the main switch element and the first capacitive element.

6. The power converter according to claim 1, wherein:
the second inductive element comprises a first winding and a second winding, wherein the first winding of the second inductive element is connected between the main switch element and the first capacitive element;
wherein the second output circuit unit further comprises:
a third switch element, connected to the second winding of the second inductive element; and
a third capacitive element, connected to the third switch element, for providing a third boost output voltage, wherein the second winding of the second inductive element is connected between the third switch element and the third capacitive element.

7. The power converter according to claim 6, wherein one of the first, second, third, and assistant switch elements comprises a MOSFET or a diode parallel-connected with one of a bipolar transistor, an insulated gate bipolar transistor, an electromechanical switch, a micro-machined switch, and an active semiconductor switch.

8. The power converter according to claim 6, wherein:
the first inductive element comprises a first winding and a second winding, wherein the first winding of the first inductive element is connected between the input node and a common node of the assistant switch element and the first switch element;
wherein the first output circuit unit further comprises:
a fourth switch element; and
a fourth capacitive element connected to the fourth switch element, for providing a fourth boost output voltage, wherein the second winding is connected between the fourth switch element and the fourth capacitive element.

9. The power converter according to claim 8, wherein one of the first, second, third, fourth, and assistant switch elements comprises a MOSFET or a diode parallel-connected with one of a bipolar transistor, an insulated gate bipolar transistor, an electromechanical switch, a micro-machined switch, and an active semiconductor switch.

10. The power converter according to claim 1, wherein one of the first, second, and assistant switch elements comprises a MOSFET or a diode parallel-connected with one of a bipolar transistor, an insulated gate bipolar transistor, an electromechanical switch, a micro-machined switch, and an active semiconductor switch.

11. The power converter according to claim 1, wherein the first node is connected to the first capacitive element.

12. The power converter according to claim 1, wherein the first node is connected to the ground.

13. The power converter according to claim 1, wherein the main switch element comprises a main switch element implemented by a MOSFET or a diode parallel-connected with one of the bipolar transistor, an insulated gate bipolar transistor, an electromechanical switch, a micro-machined switch, and an active semiconductor switch.

14. The power converter according to claim 1, wherein the main switch element comprises two series-connected active switches and a diode, wherein each of the active switches is implemented by a MOSFET, or a diode parallel-connected with one of the bipolar transistor, an insulated gate bipolar transistor (IGBT), an electromechanical switch, a micro-machined switch, and an active semiconductor switch.

15. The power converter according to claim 14, wherein the diode is connected to the first capacitive element.

16. The power converter according to claim 14, wherein the diode is connected to the input node.

* * * * *